July 24, 1962  C. B. FISHER  3,045,645
AUTOMATIC POULTRY NEST FRONT
Filed March 6, 1961  2 Sheets-Sheet 1
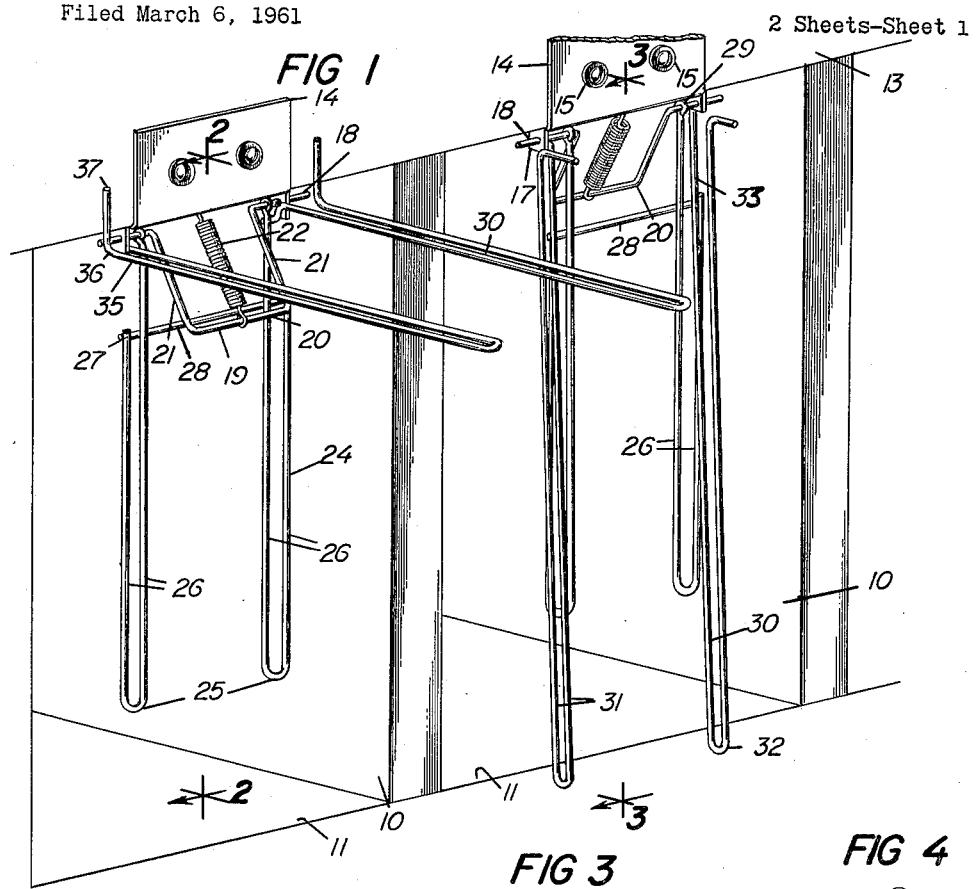
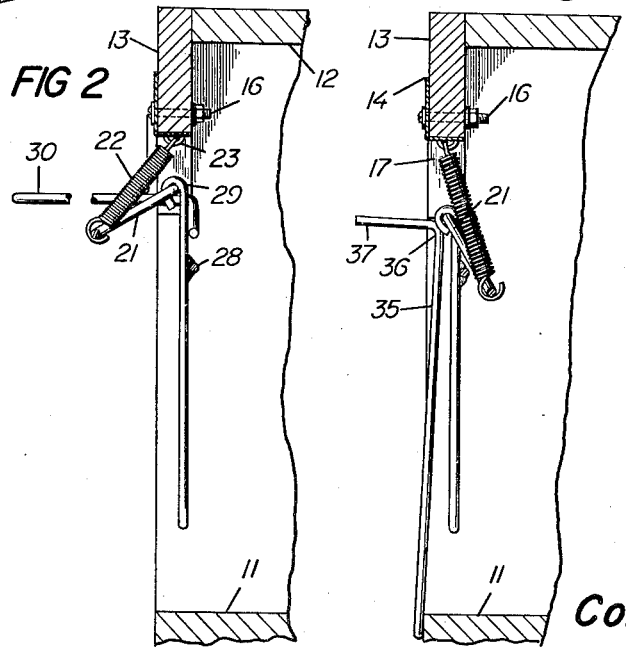
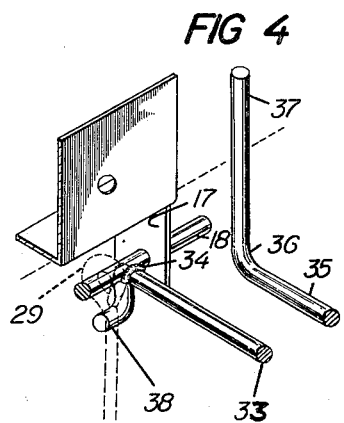
INVENTOR
*Coburn B Fisher*

July 24, 1962 C. B. FISHER 3,045,645
AUTOMATIC POULTRY NEST FRONT
Filed March 6, 1961 2 Sheets-Sheet 2
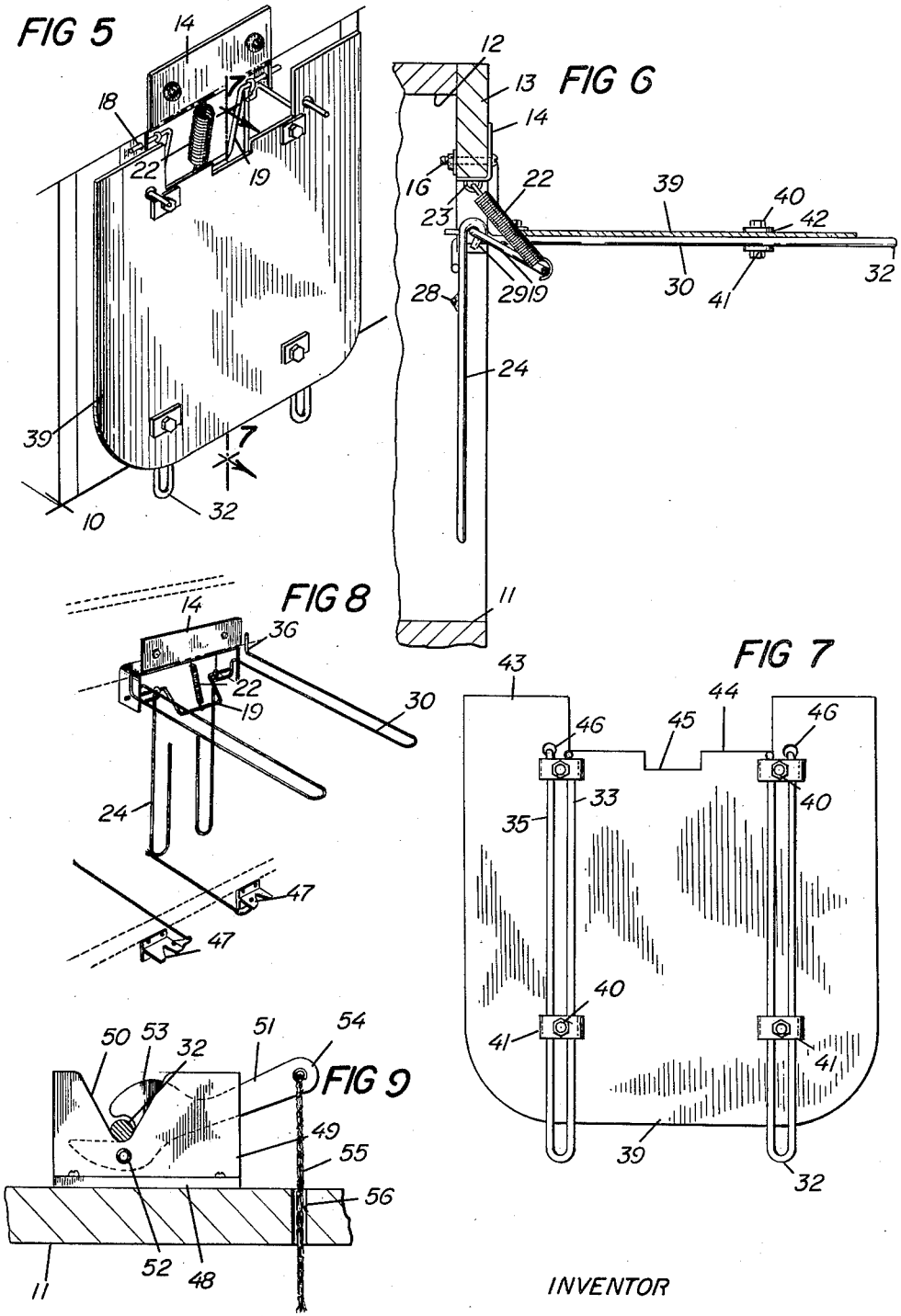
INVENTOR
Coburn B Fisher

United States Patent Office 3,045,645
Patented July 24, 1962

3,045,645
AUTOMATIC POULTRY NEST FRONT
Coburn B. Fisher, P.O. Box 421, Newcastle, Calif.
Filed Mar. 6, 1961, Ser. No. 93,460
4 Claims. (Cl. 119—49)

This invention relates generally to poultry nests, and more specifically to improvements in gating structure of the automatic class.

The use of automatic gating for turkey nests is necessary in order to ensure that only one bird occupies the nest at one itme. Such precautions ensure protection for both the laying bird and the resulting egg. Presently known automatic poultry gates have a distinct disadvantage in that a portion of the gate protrudes into the nest and can cause obstruction and discomfort to the laying bird.

It is therefore a primary object of this invention to provide an automatic turkey nest gate which is effective in ensuring the single occupancy of the turkey nest at any one time, and which provides complete freedom and lack of obstruction inwardly of the gate area.

It is a further object of this invention to provide an automatic turkey nest gate which is adapted to lock automatically upon entry of a bird to retain the same until released by an operator.

It is a still further object of this invention to provide an automatic gate attachment for turkey nests which is efficient in operation, and may be manufactured economically.

The invention briefly comprises a bracket which is secured to the top board of a turkey nest opening. Two spaced tabs project downwardly from the bracket and are drilled to pivotally mount a U-shaped rocker bar which extends downwardly and is biased selectively into a forward or rearward angle by means of a tension spring secured between the centre of the bar and the bracket. A pair of spaced back swinging arms comprising looped wires are pivotally mounted to axle portions of the rocker bar mounting. These arms are connected together by a tie bar causing the same to pivot together. Welded to project from the axle portions of the rocker bar are a pair of front arms. A lug projects radially from each arm to engage against the outer side of the back swinging arms. The front arms have stops for preventing rotation outwardly above the horizontal position, and are adapted to engage against the bottom of the nest when in the closed position. A locking device may be incorporated to lock the lower ends of the front arms to retain the bird in the nest, and a shield may be added to the outer side of the front arms to prevent the bird from attempting to leave the cage.

A full understanding of the construction of this invention, together with further novel features and advantages, will be had from the following detailed description of a preferred embodiment thereof, taken in conjunction with the attached drawings wherein:

FIG. 1 is a perspective view showing adjacent nests fitted with the improved automatic gate shown in the open and closed position.

FIG. 2 is a side elevation taken along the line 2—2 of FIG. 1, and showing the gate in an open position.

FIG. 3 is a side elevation taken along the line 3—3 of FIG. 1, and showing the gate in a closed position.

FIG. 4 is a fragmentary perspective view showing a portion of the front arm in the open position.

FIG. 5 is a perspective view of a modified form of the invention wherein a plate or shield is secured over the front.

FIG. 6 is a cross section side elevation of the modified gating of FIG. 5, shown in the open position.

FIG. 7 is a rear view of the shield taken along the line 7—7 of FIG. 5.

FIG. 8 is a perspective diagrammatic view showing how the front arm locking catches are assembled beneath the floor of the nest.

FIG. 9 is a plan view of a typical self locking catch for engaging the front arms upon closure by an entering bird.

Similar reference characters indicate corresponding parts throughout the several views in the drawing.

Referring now to the drawings in detail, the numeral 10 represents the spaced side walls of adjacent turkey nests having floors 11 and ceiling 12. A top board 13 extends along the top of the openings into each nest. The automatic gating attachment is assembled and secured to the top board 13 by a bracket 14. Spaced holes 15 are formed in the vertical portion of the bracket and receive bolts 16 for securing the same to the board 13. The bracket extends rearwardly beneath the lower edge of the board and provides two downwardly projecting tabs 17 at each end suitably drilled to rotatably mount two rocker bar axles 18. The rocker bar 19 is U-shaped and is formed by a horizontal wire 20 which is joined at each end by parallel arms 21 terminating with the normally and outwardly projecting bar axles 18. A tension spring 22 extends between the centre of the horizontal wire 20 and an eye 23 disposed centrally beneath the lower portion of the bracket 14.

A back swinging arm 24 is formed by two wires looped at one end 29 over the axles 18 inwardly of the tabs 17. The wires extend downwardly and are turned at 25 to form double arms 26 spaced parallel with respect to each other. The terminating ends 27 of the wires are connected by a welded cross arm 28 which permits the two double wired arms to pivot as one about the axles 18.

A front arm structure 30 is formed by two separate double lengths of wire 31 and terminates at one end 32 outwardly of the bottom 11 of the nest. One of the lengths 33 is welded at 34 to project radially from the axle 18 to extend in plane forwardly acute with respect to the plane formed by the rocker bar 20 and parallel arms 21. The remaining length 35 is bent normally at 36 to provide a stop arm 37 preventing the structure 30 from pivotally moving beyond the horizontal open position shown best in FIGS. 1 and 4. Projecting outwardly from the weld 34 is a lug 38 which is adapted to interfere with the out swinging pivotal movement of the back swinging arm 24 by extending transversely in front of the same.

FIGS. 5, 6 and 7 show a modification involving the addition of a substantially rectangular shield or plate 39 which is secured by bolts 40 and straps 41 and 42 to the outer side of the front arm structure 30. The bolts pass between the double lengths of wire 31 to hold the plate in position. The upper edge 43 of the plate 39 is provided with a rectangular cut-out portion 44 which provides clearance for the rocker bar 19 and tension spring 22. A further recess 45 provides yet further clearance for the spring when the plate and secured front arm structure is in the open position as shown in FIG. 6. Small holes 46 are formed through the plate permitting the stop arms 37 to project therethrough.

FIGS. 8 and 9 disclose a preferred catch mechanism for locking the front arm structure 30 in a closed position. The lock or catch 47 is formed by a plate 48 which is secured to the outwardly extending side of the nest bottom 11. A catch plate 49 is secured to project normally from the plate 48 and is provided with an inwardly extending V-shaped notch 50. A locking lever 51 is pivoted about a pin 52 extending through the plate 49 and is provided with a catch portion 53 adapted to engage about the end 32 of the front arm structure 30 which locates in the notch 50 when in the closed position. The lever terminates outwardly of the plate 49 and 54 and is connected by a cord 55 which extends through a hole 56 formed on the nest bottom and terminates rearwardly of the nest for selective pivotal release of the catch by an operator.

In the closed position it will be clear that a bird cannot enter the cage due to the front arm structure 30 which is maintained in engagement with the bottom of the nest by the action of the spring 22 against the cross arm 28, causing the axle to rotate and forcing the rocker bar 20 through a bottom dead centre position, whereupon the spring assists in opening the front arm structure until it stops in a horizontal position due to the stop arms 37. The back swinging arms 24 then fall freely back into position. Upon entry of another bird, the back swinging arms are pivoted rearwardly and in so doing engage with the projecting lugs 38 which cause the front arm structure to close behind the entering bird. The back swinging arms also return to a vertical position leaving the interior of the nest free from obstruction.

Having described the invention in a preferred form, it will be appreciated that some modifications may be made to the precise configuration, without departing from the scope or spirit of the invention, as defined by the following claims.

I claim:

1. An automatic poultry nest gate attachment for nests comprising a bracket secured to the top of the nest entrance, tabs projecting downwardly from the bracket and pivotally supporting outwardly projecting axle portions of a downwardly extending radially offset rocker bar, a tension spring secured between the rocker bar and the bracket rotatably urging said bar upwardly of the downward position about said axle portions, a back swinging arm pivotally mounted to said axle portions, and extending downwardly over the entrance to the nest, a front arm structure secured to project radially from said axle portions and having lugs adapted to engage against the outer sides of the back swinging arm, said front arm structure extending downwardly below the bottom of the nest when in the closed position.

2. An automatic poultry nest gate attachment according to claim 1, wherein said front arm structure is covered on the outer side by a plate substantially closing the entrance to the nest, and wherein the front arm structure extends downwardly beneath the plate for selective engagement by a locking catch for retaining the front arm structure in a closed position.

3. An automatic poultry nest gate attachment according to claim 1, wherein said back swinging arm comprises two downwardly extending looped wires secured together by a cross arm, one end of said looped wires curled around said axle portions for pivotal movement about the same.

4. An automatic poultry nest gate attachment according to claim 1, wherein said front arm structure comprises a pair of spaced parallel looped wires having a normally projecting stop arm for engagement with the top of the nest for preventing the structure from rotating above the horizontal line position.

References Cited in the file of this patent

UNITED STATES PATENTS

| | | |
|---|---|---|
| 2,260,028 | Houston | Oct. 21, 1941 |
| 2,992,628 | McDaniel | July 18, 1961 |